United States Patent
Wang

(10) Patent No.: US 9,898,847 B2
(45) Date of Patent: Feb. 20, 2018

(54) MULTIMEDIA PICTURE GENERATING METHOD, DEVICE AND ELECTRONIC DEVICE

(71) Applicant: Shanghai Sunson Activated Carbon Technology Co Ltd, Shanghai (CN)

(72) Inventor: Zhenyu Wang, Tianjin (CN)

(73) Assignee: Shanghai Sunson Activated Carbon Technology Co., Ltd., Shanghai (CN)

( * ) Notice: Subject to any disclaimer, the term of this patent is extended or adjusted under 35 U.S.C. 154(b) by 0 days.

(21) Appl. No.: 15/241,325

(22) Filed: Aug. 19, 2016

(65) Prior Publication Data

US 2017/0154450 A1    Jun. 1, 2017

Related U.S. Application Data

(63) Continuation of application No. PCT/CN2016/085839, filed on Jun. 15, 2016.

(30) Foreign Application Priority Data

Nov. 30, 2015    (CN) .......................... 2015 1 0861520

(51) Int. Cl.
*G06K 9/00* (2006.01)
*G06T 11/60* (2006.01)
(Continued)

(52) U.S. Cl.
CPC .......... *G06T 11/60* (2013.01); *G06F 3/04845* (2013.01); *G06F 17/30026* (2013.01);
(Continued)

(58) Field of Classification Search
CPC ................... G06T 11/60; G06T 7/0079; G06T 2207/20144; H04N 5/23229; G10L 15/22;
(Continued)

(56) References Cited

U.S. PATENT DOCUMENTS 5,313,555 A * 5/1994 Kamiya .................. G10L 15/20
704/233
5,404,422 A * 4/1995 Sakamoto ............... G10L 15/16
704/232

(Continued)

FOREIGN PATENT DOCUMENTS

CN       101216841 A       7/2008
CN       101853253 A       10/2010
(Continued)

OTHER PUBLICATIONS

State Intellectual Property Office of the P. R. China, International Search Report for PCT/CN2016/085839, dated Sep. 14, 2016, 2 pages.

*Primary Examiner* — Amir Alavi
(74) *Attorney, Agent, or Firm* — Liang Legal Group, PLLC

(57) ABSTRACT

The present disclosure provides a multimedia picture generating method, device and electronic device, wherein the multimedia picture generating method comprises acquiring a picture of a photographed subject of a photographing device; extracting a figure image as a foreground image from the picture after receiving an instruction for removing picture background; performing voice recognition after receiving a voice command inputted by a user; searching out multimedia content that matches a user command information recognized by voice recognition from a multimedia database as background content for the picture; and generating a multimedia picture that contains the foreground image and the background content. Thus, when a user wants to replace the picture background, a figure image can be automatically extracted from the picture as a foreground image, and the original background with poor effect can be removed, then an image and/or music that matches a user command information can be automatically searched out (Continued)

from a multimedia database, which increases the search efficiency, simplifies the optimum processing and improves the user experience.

13 Claims, 3 Drawing Sheets

(51) Int. Cl.
- *H04N 5/232* (2006.01)
- *G10L 15/22* (2006.01)
- *G10L 15/08* (2006.01)
- *G06F 17/30* (2006.01)
- *G06F 3/0484* (2013.01)

(52) U.S. Cl.
CPC .. *G06F 17/30038* (2013.01); *G06F 17/30047* (2013.01); *G10L 15/08* (2013.01); *G10L 15/22* (2013.01); *H04N 5/23229* (2013.01); *H04N 5/23293* (2013.01); *G10L 2015/088* (2013.01); *G10L 2015/223* (2013.01)

(58) Field of Classification Search
CPC .............. G10L 15/08; G10L 2015/223; G10L 2015/088; G06F 17/30026; G06F 17/30047; G06F 17/30038

See application file for complete search history.

(56) References Cited

U.S. PATENT DOCUMENTS

| | | | |
|---|---|---|---|
| 6,134,524 A * | 10/2000 | Peters | G10L 25/87 704/233 |
| 7,925,304 B1 * | 4/2011 | Gailloux | H04M 3/42 379/88.16 |
| 2003/0177006 A1 * | 9/2003 | Ichikawa | G10L 21/0216 704/231 |
| 2007/0225972 A1 * | 9/2007 | Kim | G10L 25/93 704/210 |
| 2013/0144617 A1 * | 6/2013 | Murakami | H04M 3/42314 704/226 |
| 2017/0154450 A1 * | 6/2017 | Wang | G10L 15/08 |
| 2017/0171471 A1 * | 6/2017 | Wang | H04N 5/265 |

FOREIGN PATENT DOCUMENTS

| | | |
|---|---|---|
| CN | 104144097 A | 11/2014 |
| CN | 105100491 A | 11/2015 |

* cited by examiner

MULTIMEDIA PICTURE GENERATING METHOD, DEVICE AND ELECTRONIC DEVICE

CROSS REFERENCE TO RELATED APPLICATIONS

This application is a continuation of International Application No. PCT/CN2016/085839 filed on Jun. 15, 2016, which is based upon and claims priority to Chinese Patent Application No. 201510861520.6 filed on Nov. 30, 2015, the entire content of which is incorporated herein by reference.

TECHNICAL FIELD

The present disclosure relates to the field of multimedia technology, and in particular relates to a multimedia picture generating method, device and electronic device.

BACKGROUND

Devices with photographing capability such as smart phones and tablet computers have become very good social media tools because of their functions such as convenience of carrying and ability of quickly disseminating information. Along with their increasing popularity, more and more auxiliary functions have been added thereto, for instance, the photographed picture can be edited and then sent to social media platforms for sharing by means of social media software (e.g. Wechat, Microblog, QQ chat tool) built in the smart phone or tablet computer.

Currently, if a user wants to modify a picture background, he/she needs to use a picture editing software to perform analyzing, repairing, beautifying and synthesizing on the picture. But, since the picture editing software is highly specialized and very difficult to operate, a non-professional user is required to learn and be familiar with the corresponding software operation methods in order to attain a satisfactory effect; even for a professional user, picking out an image that matches his/her own demands from a vast amount of images also requires a lot of time, and therefore a multimedia picture that matches his/her own demands cannot be quickly generated, which causes poor experience.

SUMMARY

Therefore, the present disclosure provides a multimedia picture generating method, device and electronic device that are able to simplify the optimum processing of a picture and thus improve the user experience.

One objective of the embodiments of the present disclosure is to provide a multimedia picture generating method, comprising:
  acquiring a picture of a photographed subject;
  extracting a figure image as a foreground image from the picture after receiving an instruction for removing picture background;
  receiving a voice command inputted by a user, and performing voice recognition;
  searching out multimedia content that matches a user command information recognized by voice recognition from a multimedia database as background content for the picture;
  generating a multimedia picture that contains the foreground image and the background content.

Another objective of the embodiments of the present disclosure is to provide a multimedia picture generating device comprising:
  a photographing apparatus for taking a picture of a photographed subject of a photographing device;
  a multimedia picture generating apparatus, connected with the photographing apparatus, for acquiring a picture sent from the photographing apparatus, extracting a figure image as a foreground image from the picture after receiving an instruction for removing picture background, performing voice recognition after receiving a voice command inputted by a user, searching out multimedia content that matches a user command information recognized by voice recognition from a multimedia database as background content for the picture, and generating a multimedia picture that contains the foreground image and the background content;
  a display apparatus, connected with the photographing apparatus and the multimedia picture generating apparatus, for displaying the picture and the multimedia picture;
  a player apparatus, connected with the multimedia picture generating apparatus, for playing the background content.

A further objective of the embodiments of the present disclosure is to provide an electronic device, comprising at least one processor; and a memory communicably connected with the at least one processor for storing instructions executable by the at least one processor, wherein execution of the instructions by the at least one processor causes the at least one processor to: acquire a picture of a photographed subject; extract a figure image as a foreground image from the picture after receiving an instruction for removing picture background; receive a voice command inputted by a user, and performing voice recognition; search out multimedia content that matches a user command information recognized by voice recognition from a multimedia database as background content for the picture; generate a multimedia picture that contains the foreground image and the background content.

A further objective of the embodiments of the present disclosure is to provide a non-transitory computer-readable storage medium storing executable instructions that, when executed by an electronic device, cause the electronic device to: acquire a picture of a photographed subject; extract a figure image as a foreground image from the picture after receiving an instruction for removing picture background; receive a voice command inputted by a user, and performing voice recognition; search out multimedia content that matches a user command information recognized by voice recognition from a multimedia database as background content for the picture; generate a multimedia picture that contains the foreground image and the background content.

The embodiments of the present disclosure provides a multimedia picture generating method, device and electronic device which comprises acquiring a picture of a photographed subject; extracting a figure image as a foreground image from the picture after receiving an instruction for removing picture background; performing voice recognition after receiving a voice command inputted by a user; searching out multimedia content that matches a user command information recognized by voice recognition from a multimedia database as background content for the picture; and generating a multimedia picture that contains the foreground image and the background content. Thus, when a user wants to replace the picture background, a figure image can he automatically extracted from the picture as a foreground image, and the original background with poor effect can be removed, so that the user is not required to optimize the picture background by using a specialized picture editing software and instead is only required to send an instruction for removing picture background in order to replace the background with a satisfactory image, which simplifies the optimum processing and improves the user experience. A user command information can be acquired by performing voice recognition on user voice, so as to automatically search out multimedia content that matches the user command information from a multimedia database, and thus the user is not required to manually pick out multimedia content that matches his/her own demand from a vast amount of images and/or music, which increases the search efficiency. After that, a multimedia picture that contains the foreground image and the background content is generated, so that a perfect combination of visual and audial effects can be attained.

BRIEF DESCRIPTION OF THE DRAWINGS

One or more embodiments are illustrated by way of example, and not by limitation, in the figures of the accompanying drawings, wherein elements having the same reference numeral designations represent like elements throughout. The drawings are not to scale, unless otherwise disclosed.

REFERENCE NUMERALS

1—original photo acquiring unit; 2—foreground image extracting unit; 3—command recognition unit; 4—matching unit; 5—generating unit; 11—photographing apparatus; 12—multimedia picture generating apparatus; 13—display apparatus; 14—player apparatus.

DETAILED DESCRIPTION OF EMBODIMENTS

In order to clearly describe objectives, the technical solutions and advantages of the present disclosure, a clear and complete description of the technical solutions in the present disclosure will be given below, in conjunction with the accompanying drawings in the embodiments of the present disclosure. Apparently, the embodiments described below are a part, but not all, of the embodiments of the present disclosure.

Embodiment 1

Figure 1:
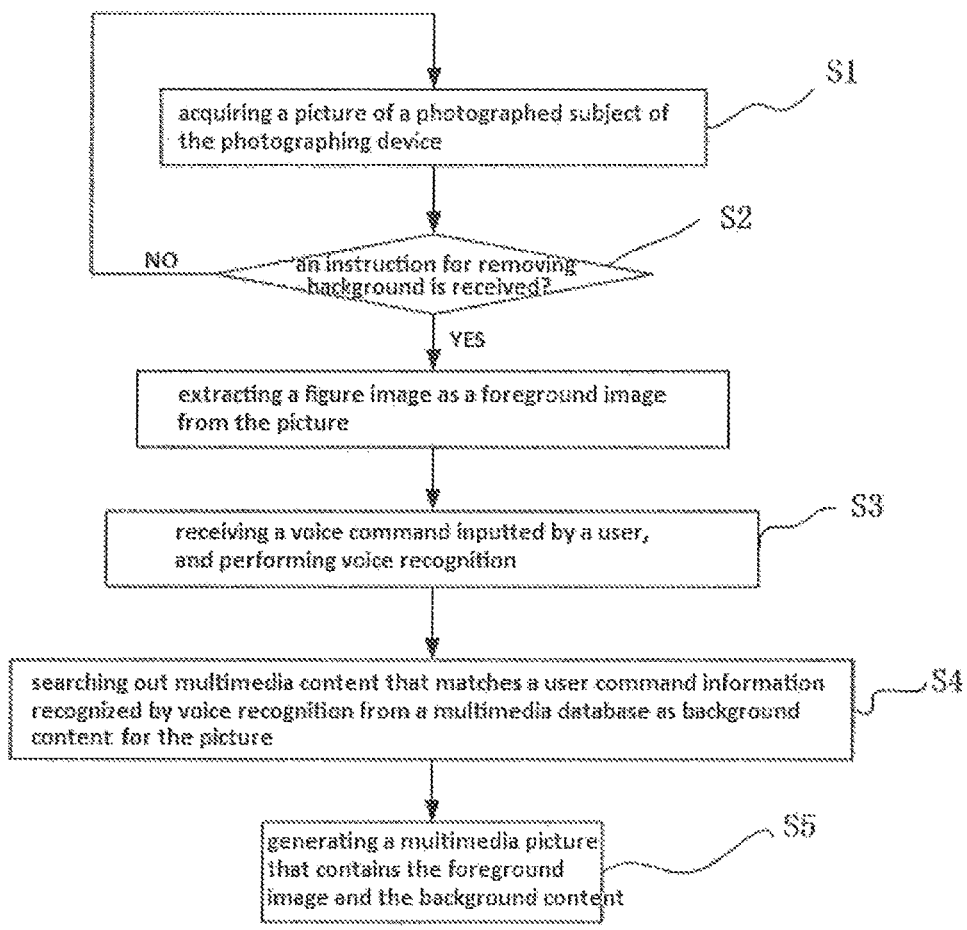
FIG. 1 is a flow chart of a specific example of the multimedia picture generating method in Embodiment 1 of the present disclosure.

The present embodiment provides a multimedia picture generating method that is used for a photographing device such as an electronic device with photographing capability including a cell phone, a pad, a notebook computer. As shown in FIG. 1, the method comprises the following steps:

S1, acquiring a picture of a photographed subject of the photographing device.

S2, extracting a figure image as a foreground image from the picture after receiving an instruction for removing picture background.

Specifically, contour analysis method is used to determine the figure image in the picture and thus extract the figure image as a foreground image. Of course, any method in prior art that is able to extract a figure image from a picture can be used to implement the aforementioned operation.

S3, receiving a voice command inputted by a user, and performing voice recognition. Specifically, any software in prior art with voice recognition function can be used to implement the function of voice recognition.

S4, searching out multimedia content that matches a user command information recognized by voice recognition from a multimedia database as background content for the picture. Multimedia content includes texts, images, sounds, animations and videos which can be integrated with a picture as background content. The preferable embodiments of the present disclosure take images and/or music as examples and the preferable background content includes background image and background music. Specifically, a user might not be satisfied with the photographing environment when taking a picture, for instance, when the user takes a picture at home but wants to replace the picture background with a scene of a place of historic interest and scenic beauty or a scene of a place having excellent scenery, e.g. wants to replace the picture background with a scene of the Eiffel Tower or the Fuji Mountain in Japan, the user makes a voice containing a content about the Eiffel Tower or the Fuji Mountain, then by performing voice recognition on the user voice, a user command information can be acquired to set an image containing a scene of the Eiffel Tower or the Fuji Mountain as a new background image for the picture; for another instance, when the user wants to add some favorite music into the picture, e.g. wants to add a favorite pop song, the user directly speaks the name of this pop song, then by voice recognition, a user command information can be acquired to set this pop song as background music for the picture. According to the aforementioned user command information, an image and/or music that matches the user command information is automatically searched out from a multimedia database and set as a background image and/or background music for the picture, so as to ensure that the image and music set as the background image and background music meet the real demands of the user, thereby improving the user experience.

S5, generating a multimedia picture that contains the foreground image and the background content.

By means of the multimedia picture generating method in this embodiment, when a user wants to replace the picture background, a figure image can be automatically extracted from the picture as a foreground image, and the original background with poor effect can be removed, so that the user is not required to optimize the picture background by using a specialized picture editing software and instead is only required to send an instruction for removing picture background in order to replace the background with a satisfactory image, which simplifies the optimum processing and improves the user experience. A user command information can be acquired by performing voice recognition on user voice, so as to automatically search out multimedia content that matches the user command information from a multimedia database, and thus the user is not required to manually pick out multimedia content that matches his/her own demand from a vast amount of images and/or music, which increases the search efficiency. After that, a multimedia picture that contains the foreground image and the background content is generated, so that a perfect combination of visual and audial effects can be attained.

Figure 2:
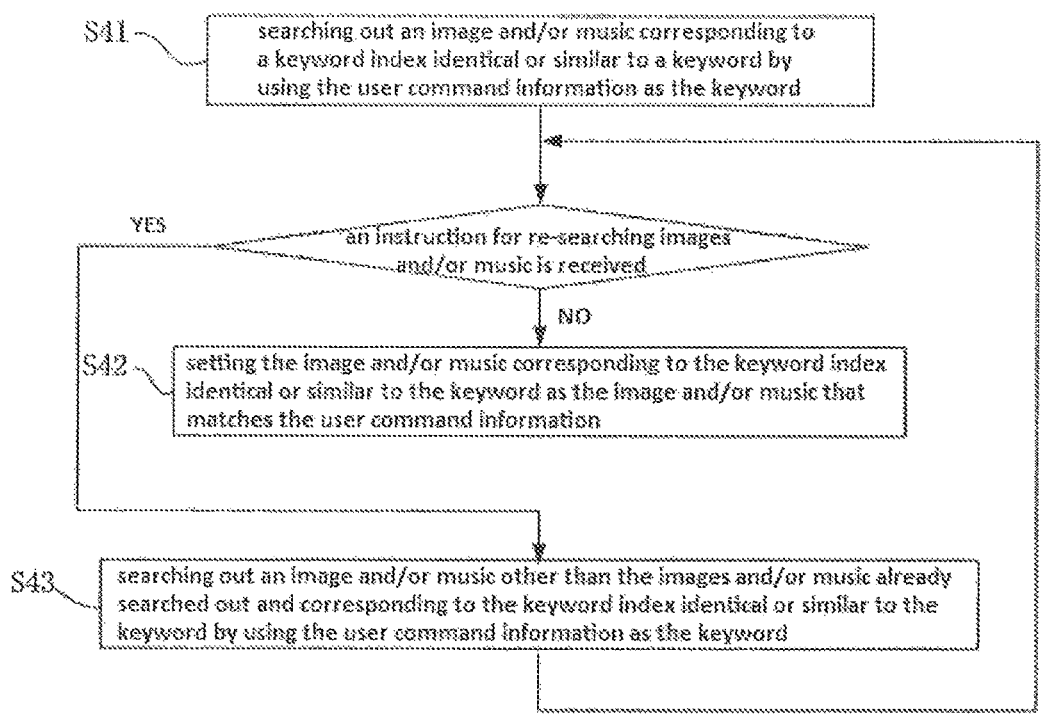
FIG. 2 is a flow chart of a specific example of searching out an image and/or music that matches a user command information from a multimedia database in the multimedia picture generating method in Embodiment 1 of the present disclosure.

Optionally, as shown in FIG. 2, the step S4 comprises:

S41, searching out an image and/or music corresponding to a keyword index identical or similar to a keyword from the multimedia database having keyword indexes corresponding to images and music stored therein by using the user command information as the keyword. Specifically, music and images are stored with keyword indexes into the multimedia database so as to facilitate later searches. A common keyword indexing means is by using TIF formatted information, then by reading the TIF information of images and music, the content presented by the images and music can be known, which is very convenient. If the keyword index corresponding to an image and/or music is more similar to the user command information keyword, it indicates that the content presented by the image and/or music is more close to the real demand of the user, with a higher matching degree. By searching out an image and/or music corresponding to a keyword index identical or similar to the user command information keyword, the image and/or music with the highest matching degree in relation to the user demand can be ensured to be pushed to the user;

S42, setting the image and/or music corresponding to the keyword index identical or similar to the keyword as the multimedia content that matches the user command information; and S43, if an instruction for re-searching images and/or music is received, searching out an image and/or music other than the images and/or music already searched out and corresponding to the keyword index identical or similar to the keyword from the multimedia database by using the user command information as the keyword, until no further instruction for re-searching images and/or music is received; then returning to the step S42, and setting the image and/or music finally searched out and corresponding to the keyword index identical or similar to the keyword as the multimedia content that matches the user command information.

The multimedia picture generating method in this embodiment ensures that the image and music finally selected as the background content always satisfies the user, which lays a foundation for generating a multimedia picture containing the foreground image and the background content that has a high user satisfaction, thereby improving the user experience.

Optionally, the multimedia picture generating method in this embodiment performs the steps of determining if an instruction for removing picture background is received and determining if an instruction for re-searching images and/or music is received by recognizing user voice, so that the user is not required to manually input an instruction, and by recognizing a voice made by the user, a corresponding instruction can be acquired and a corresponding operation can be carried out according to the instruction, so that both hands of the user are freed, the user demands can be quickly responded to, and the user experience is improved.

Embodiment 2

The present embodiment provides a multimedia picture generating apparatus, used for a photographing device, comprising:

an original photo acquiring unit 1 for acquiring a picture of a photographed subject of the photographing device;

a foreground image extracting unit 2 for extracting a figure image as a foreground image from the picture after receiving an instruction for removing picture background;

a command recognition unit 3 for receiving a voice command inputted by a user and performing voice recognition;

a matching unit 4 for searching out multimedia content that matches a user command information recognized by voice recognition from a multimedia database as background content for the picture; and a generating unit 5 for generating a multimedia picture that contains the foreground image and the background content.

By means of the multimedia picture generating apparatus in this embodiment, when a user wants to replace the picture background, a figure image can be automatically extracted from the picture as a foreground image, and the original background with poor effect can be removed, so that the user is not required to optimize the picture background by using a specialized picture editing software and instead is only required to send an instruction for removing picture background in order to replace the background with a satisfactory image, which simplifies the optimum processing and improves the user experience. A user command information can be acquired by performing voice recognition on user voice, so as to automatically search out multimedia content that matches the user command information from a multimedia database, and thus the user is not required to manually pick out multimedia content that matches his/her own demands from a vast amount of images and/or music, which increases the search efficiency. After that, a multimedia picture that contains the foreground image and the background content is generated, so that a perfect combination of visual and audial effects can be attained.

Optionally, the matching unit 4 is for searching out an image and/or music corresponding to a keyword index identical or similar to a keyword from the multimedia database having keyword indexes corresponding to images and music stored therein by using the user command information as the keyword; and if no instruction for re-searching images and/or music is received, setting the image and/or music corresponding to the keyword index identical or similar to the keyword as the multimedia content that matches the user command information.

Optionally, the matching unit 4 is further for searching out an image and/or music other than the images and/or music already searched out and corresponding to the keyword index identical or similar to the keyword from the multimedia database by using the user command information as the keyword if an instruction for re-searching images and/or music is received, until no further instruction for re-searching images and/or music is received; and setting the image and/or music finally searched out and corresponding to the keyword index identical or similar to the keyword as the multimedia content that matches the user command information.

The multimedia picture generating apparatus in this embodiment ensures that the image and music finally selected as the background content always satisfies the user, which lays a foundation for generating a multimedia picture containing the foreground image and the background content that has a high user satisfaction, thereby improving the user experience.

Optionally, the command recognition unit 3 is for determining if an instruction for removing picture background is received and determining if an instruction for re-searching images and/or music is received by recognizing user voice, so that the user is not required to manually input an instruction, and by recognizing a voice made by the user, a corresponding instruction can be acquired and a corresponding operation can be carried out according to the instruction, so that both hands of the user are freed, the user demand can be quickly responded to, and the user experience is improved.

Embodiment 3

The present embodiment provides a multimedia picture generating device comprising: a photographing apparatus 11, a multimedia picture generating apparatus 12, a display apparatus 13, and a player apparatus 14.

The photographing apparatus 11 is for taking a picture of a photographed subject of a photographing device. Specifically, the photographing apparatus 11 may comprise components such as a camera head, a flashlight.

The multimedia picture generating apparatus 12 is connected with the photographing apparatus 11 and is for acquiring a picture sent from the photographing apparatus 11, extracting a figure image as a foreground image from the picture after receiving an instruction for removing picture background, performing voice recognition after receiving a voice command inputted by a user, searching out multimedia content that matches a user command information recognized by voice recognition from a multimedia database as background content for the picture, and generating a multimedia picture that contains the foreground image and the background content. Specifically, the multimedia picture generating apparatus 12 may be a controller with built-in programs that can perform the steps in Embodiment 1, so as to achieve automatic optimum processing of a picture. The multimedia picture generating apparatus 12 has access to a multimedia database in the memory of the photographing device, and also has access to a multimedia database stored in devices other than the photographing device, which provides technical support for searching out an image and/or music that satisfies the user demand.

The display apparatus 13 is connected with the photographing apparatus 11 and the multimedia picture generating apparatus 12, and is for displaying the picture and the multimedia picture. Specifically, the display apparatus 13 may he a display screen which presents the picture that has been photographed to the user in order for the user to timely determine whether the background thereof needs to be removed, presents the image that has been searched out to the user in order for the user to timely determine if the image needs to be re-matched, and also allows the user to instantaneously enjoy the multimedia picture that has been optimized and generated.

The player apparatus 14 is connected with the multimedia picture generating apparatus 12 and is for playing the background content. Specifically, the player apparatus 14 may be a micro-electronic loudspeaker which plays the music that has been searched out to the user in order for the user to timely determine whether the music needs to be re-matched, and also allows the user to instantaneously enjoy the music in the background content of the multimedia picture.

By means of the multimedia picture generating device in this embodiment, when a user wants to replace the picture background, a figure image can be automatically extracted from the picture as a foreground image, and the original background with poor effect can be removed, so that the user is not required to optimize the picture background by using a specialized picture editing software and instead is only required to send an instruction for removing picture background in order to replace the background with a satisfactory image, which simplifies the optimum processing and improves the user experience. A user command information can be acquired by performing voice recognition on user voice, so as to automatically search out an image and/or music that matches the user command information from a multimedia database, and thus the user is not required to manually pick out an image and music that matches his/her own demands from a vast amount of images and music, which increases the search efficiency. After that, a multimedia picture that contains the foreground image and the background content is generated, so that a perfect combination of visual and audial effects can be attained. The user is also not required to manually input an instruction, and by recognizing a voice made by the user, a corresponding instruction can be acquired and a corresponding operation can be carried out according to the instruction, so that both hands of the user are freed, the user demands can be quickly responded to, and the user experience is improved.

Embodiment 4

The present embodiment provides a cell phone comprising the multimedia picture generating apparatus in Embodiment 2 or comprising the multimedia picture generating device in Embodiment 3.

By means of the cell phone in this embodiment, when a user wants to replace the picture background, a figure image can be automatically extracted from the picture as a foreground image, and the original background with poor effect can be removed, so that the user is not required to optimize the picture background by using a specialized picture editing software and instead is only required to send an instruction for removing picture background in order to replace the background with a satisfactory image, which simplifies the optimum processing and improves the user experience. A user command information can be acquired by performing voice recognition on user voice, so as to automatically search out multimedia content that matches the user command information from a multimedia database, and thus the user is not required to manually pick out an image and/or music that matches his/her own demand from a vast amount of images and/or music, which increases the search efficiency. After that, a multimedia picture that contains the foreground image and the background content is generated, so that a perfect combination of visual and audial effects can be attained. The user is also not required to manually input an instruction, and by recognizing a voice made by the user, a corresponding instruction can be acquired and a corresponding operation can be carried out according to the instruction, so that both hands of the user are freed, the user demand can be quickly responded to, and the user experience is improved.

Embodiment 5

Figure 5:
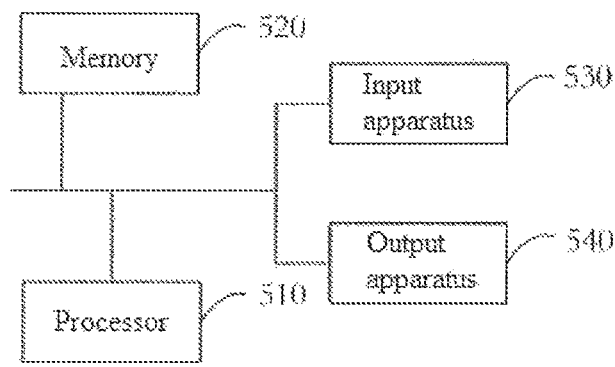
FIG. 5 is a schematic diagram of the hardware configuration of the electronic device in Embodiment 5 of the present disclosure, which performs the multimedia picture generating method.

FIG. 5 is a schematic diagram of the hardware configuration of the electronic device provided by the present embodiment, which performs the multimedia picture generating method. As shown in FIG. 5, the electronic device includes: one or more processors 510 and a memory 520, wherein one processor 510 is shown in FIG. 5 as an example. The electronic device that performs the multimedia picture generating method further comprises: an input apparatus 530 and an output apparatus 540.

The processor 510, the memory 520, the input apparatus 530 and the output apparatus 540 may be connected via a bus line or other means, wherein connection via a bus line is shown in FIG. 5 as an example.

Figure 3:
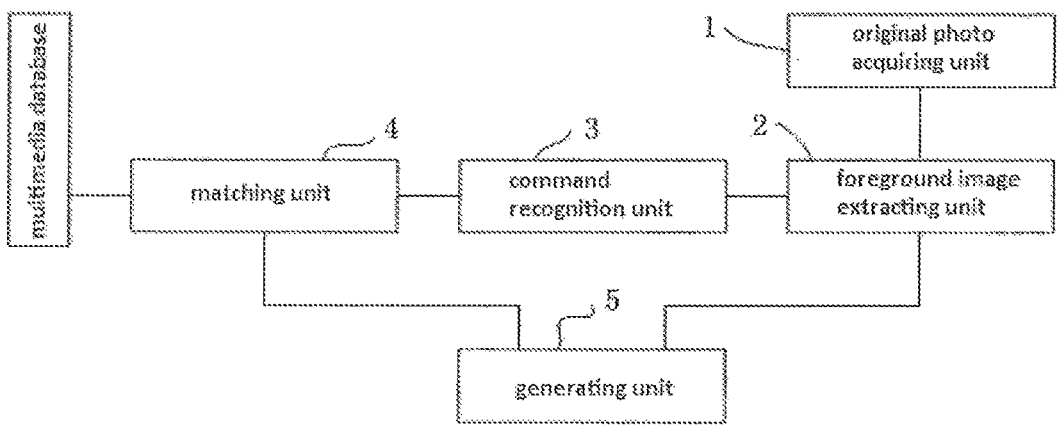
FIG. 3 is a block diagram of a specific example of the multimedia picture generating apparatus in Embodiment 2 of the present disclosure.
Figure 4:
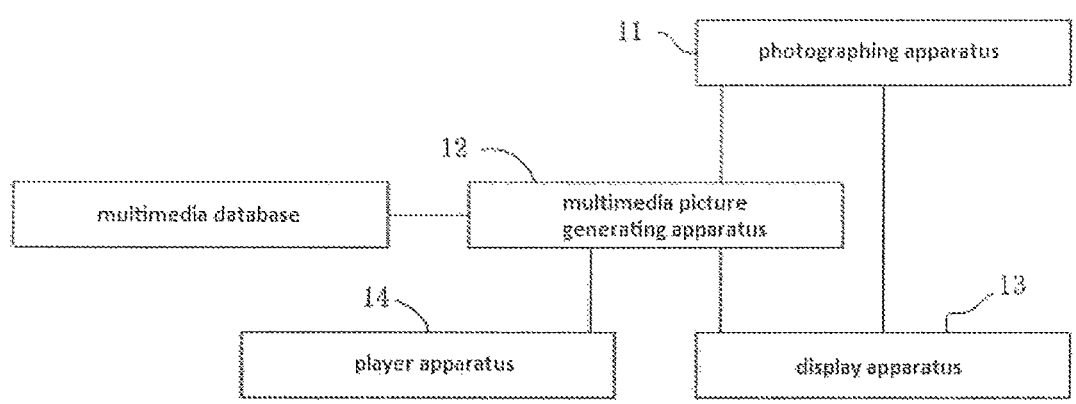
FIG. 4 is a block diagram of a specific example of the multimedia picture generating device in Embodiment 3 of the present disclosure.

The memory 520 is a non-transitory computer-readable storage medium that can be used to store non-transitory software programs, non-transitory computer-executable programs and modules, such as the program instructions/modules corresponding to the multimedia picture generating method of the embodiments of the present disclosure (e.g. the original photo acquiring unit 1, the foreground image extracting unit 2, the command recognition unit 3, the matching unit 4 and the generating unit 5 shown in FIG. 3). The processor 510 executes the non-transitory software programs, instructions and modules stored in the memory 520 so as to perform various function application and data processing of the server, thereby implementing the multimedia picture generating method of the above-mentioned method embodiments The memory 520 includes a program storage area and a data storage area, wherein, the program storage area can store an operation system and application programs required for at least one function; the data storage area can store data generated by use of the multimedia picture generating device. Furthermore, the memory 520 may include a high-speed random access memory, and may also include a non-volatile memory, e.g. at least one magnetic disk memory unit, flash memory unit, or other non-volatile solid-state memory unit. In some embodiments, optionally, the memory 520 includes a remote memory accessed by the processor 510, and the remote memory is connected to the multimedia picture generating device via network connection. Examples of the aforementioned network include but not limited to internet, intranet, LAN, GSM, and their combinations.

The input apparatus 530 receives digit or character information, so as to generate signal input related to the user configuration and function control of the multimedia picture generating device. The output apparatus 540 includes display devices such as a display screen.

The one or more modules are stored in the memory 520 and, when executed by the one or more processors 510, perform the multimedia picture generating method of any one of the above-mentioned method embodiments.

The above-mentioned product can perform the method provided by the embodiments of the present disclosure and have function modules as well as beneficial effects corresponding to the method. Those technical details not described in this embodiment can be known by referring to the method provided by the embodiments of the present disclosure.

The electronic device of the embodiments of the present disclosure can exist in many forms, including but not limited to:

(1) Mobile communication devices: The characteristic of this type of device is having a mobile communication function with a main goal of enabling voice and data communication. This type of terminal device includes: smartphones (such as iPhone), multimedia phones, feature phones, and low-end phones.

(2) Ultra-mobile personal computer devices: This type of device belongs to the category of personal computers that have computing and processing functions and usually also have mobile internet access features. This type of terminal device includes: PDA, MID, UMPC devices, such as iPad.

(3) Portable entertainment devices: This type of device is able to display and play multimedia contents. This type of terminal device includes: audio and video players (such as iPod), handheld game players, electronic books, intelligent toys, and portable GPS devices.

(4) Servers: devices providing computing service. The structure of a server includes a processor, a hard disk, an internal memory, a system bus, etc. A server has an architecture similar to that of a general purpose computer, but in order to provide highly reliable service, a server has higher requirements in aspects of processing capability, stability, reliability, security, expandability, manageability.

(5) Other electronic devices having data interaction function.

Embodiment 6

The present embodiment provides a non-transitory computer-readable storage medium storing executable instructions that, when executed by an electronic device, cause the electronic device to perform the multimedia picture generating method of any one of the above-mentioned method embodiments.

The above-mentioned device embodiments are only illustrative, wherein the units described as separate parts may be or may not be physically separated, the component shown as a unit may be or may not be a physical unit, i.e. may be located in one place, or may be distributed at multiple network units. According to actual requirements, part of or all of the modules may be selected to attain the purpose of the technical scheme of the embodiments.

By reading the above-mentioned description of embodiments, those skilled in the art can clearly understand that the various embodiments may be implemented by means of software plus a general hardware platform, or just by means of hardware. Based on such understanding, the above-mentioned technical scheme in essence, or the part thereof that has a contribution to related prior art, may he embodied in the form of a software product, and such a software product may be stored in a computer-readable storage medium such as ROM/RAM, magnetic disk or optical disk, and may include a plurality of instructions to cause a computer device (which may be a personal computer, a server, or a network device) to execute the methods described in the various embodiments or in some parts thereof.

Finally, it should be noted that: The above-mentioned embodiments are merely illustrated for describing the technical scheme of the present disclosure, without restricting the technical scheme of the present disclosure. Although detailed description of the present disclosure is given with reference to the above-mentioned embodiments, those skilled in the art should understand that they still can modify the technical scheme recorded in the above-mentioned various embodiments, or substitute part of the technical features therein with equivalents. These modifications or substitutes would not cause the essence of the corresponding technical scheme to deviate from the concept and scope of the technical scheme of the various embodiments of the present disclosure.

What is claimed is:
1. A multimedia picture generating method, comprising:
  acquiring a picture of a photographed subject;
  extracting a figure image as a foreground image from the picture after receiving an instruction for removing picture background;

receiving a voice command inputted by a user, and performing voice recognition;

searching out multimedia content that matches a user command information recognized by voice recognition from a multimedia database as background content for the picture;

generating a multimedia picture that contains the foreground image and the background content.

2. The multimedia picture generating method of claim 1, wherein, searching out multimedia content that matches the user command information recognized by voice recognition from the multimedia database as background content for the picture comprises:

searching out an image and/or music corresponding to a keyword index identical or similar to a keyword from the multimedia database having keyword indexes corresponding to images and music stored therein by using the user command information as the keyword; and setting the image and/or music corresponding to the keyword index identical or similar to the keyword as the multimedia content that matches the user command information.

3. The multimedia picture generating method of claim 2, wherein, after searching out an image and/or music corresponding to the keyword index identical or similar to the keyword from the multimedia database by using the user command information as the keyword, the method further comprises:

if an instruction for re-searching images and/or music is received, searching out an image and/or music other than the images and/or music already searched out and corresponding to the keyword index identical or similar to the keyword from the multimedia database by using the user command information as the keyword, until no further instruction for re-searching images and/or music is received;

setting the image and/or music finally searched out and corresponding to the keyword index identical or similar to the keyword as the multimedia content that matches the user command information.

4. The multimedia picture generating method of claim 1, wherein, judging whether an instruction for removing picture background is received and judging whether an instruction for re-searching images and/or music is received are performed by recognizing user voice.

5. A multimedia picture generating device, comprising:
a photographing apparatus (11) for taking a picture of a photographed subject of a photographing device;
a multimedia picture generating apparatus (12), connected with the photographing apparatus (11), for acquiring a picture sent from the photographing apparatus (11), extracting a figure image as a foreground image from the picture after receiving an instruction for removing picture background, performing voice recognition after receiving a voice command inputted by a user, searching out multimedia content that matches a user command information recognized by voice recognition from a multimedia database as background content for the picture, and generating a multimedia picture that contains the foreground image and the background content;
a display apparatus (13), connected with the photographing apparatus (11) and the multimedia picture generating apparatus (12), for displaying the picture and the multimedia picture;
a player apparatus (14), connected with the multimedia picture generating apparatus (12), for playing the background content.

6. An electronic device, comprising:
at least one processor; and
a memory communicably connected with the at least one processor for storing instructions executable by the at least one processor, wherein execution of the instructions by the at least one processor causes the at least one processor to:
acquire a picture of a photographed subject;
extract a figure image as a foreground image from the picture after receiving an instruction for removing picture background;
receive a voice command inputted by a user, and performing voice recognition;
search out multimedia content that matches a user command information recognized by voice recognition from a multimedia database as background content for the picture;
generate a multimedia picture that contains the foreground image and the background content.

7. The electronic device of claim 6, wherein, searching out multimedia content that matches the user command information recognized by voice recognition from the multimedia database as background content for the picture comprises:

searching out an image and/or music corresponding to a keyword index identical or similar to a keyword from the multimedia database having keyword indexes corresponding to images and music stored therein by using the user command information as the keyword; and setting the image and/or music corresponding to the keyword index identical or similar to the keyword as the multimedia content that matches the user command information.

8. The electronic device of claim 7, wherein, after searching out an image and/or music corresponding to the keyword index identical or similar to the keyword from the multimedia database by using the user command information as the keyword, the at least one processor is further caused to:

if an instruction for re-searching images and/or music is received, search out an image and/or music other than the images and/or music already searched out and corresponding to the keyword index identical or similar to the keyword from the multimedia database by using the user command information as the keyword, until no further instruction for re-searching images and/or music is received;

set the image and/or music finally searched out and corresponding to the keyword index identical or similar to the keyword as the multimedia content that matches the user command information.

9. The electronic device of claim 6, wherein, judging whether an instruction for removing picture background is received and judging whether an instruction for re-searching images and/or music is received are performed by recognizing user voice.

10. A non-transitory computer-readable storage medium storing executable instructions that, when executed by an electronic device, cause the electronic device to:
acquire a picture of a photographed subject;
extract a figure image as a foreground image from the picture after receiving an instruction for removing picture background;
receive a voice command inputted by a user, and performing voice recognition;

search out multimedia content that matches a user command information recognized by voice recognition from a multimedia database as background content for the picture;

generate a multimedia picture that contains the foreground image and the background content.

11. The non-transitory computer-readable storage medium of claim 10, wherein, searching out multimedia content that matches the user command information recognized by voice recognition from the multimedia database as background content for the picture comprises:

searching out an image and/or music corresponding to a keyword index identical or similar to a keyword from the multimedia database having keyword indexes corresponding to images and music stored therein by using the user command information as the keyword; and setting the image and/or music corresponding to the keyword index identical or similar to the keyword as the multimedia content that matches the user command information.

12. The non-transitory computer-readable storage medium of claim 11, wherein, after searching out an image and/or music corresponding to the keyword index identical or similar to the keyword from the multimedia database by using the user command information as the keyword, the electronic device is further caused to:

if an instruction for researching images and/or music is received, search out an image and/or music other than the images and/or music already searched out and corresponding to the keyword index identical or similar to the keyword from the multimedia database by using the user command information as the keyword, until no further instruction for re-searching images and/or music is received;

set the image and/or music finally searched out and corresponding to the keyword index identical or similar to the keyword as the multimedia content that matches the user command information.

13. The non-transitory computer-readable storage medium of claim 10, wherein, judging whether an instruction for removing picture background is received and judging whether an instruction for re-searching images and/or music is received are performed by recognizing user voice.

* * * * *